United States Patent [19]

Ñakonechny et al.

[11] Patent Number: 5,085,691
[45] Date of Patent: Feb. 4, 1992

[54] METHOD OF PRODUCING GENERAL-PURPOSE STEEL

[76] Inventors: Anatoly Y. Ñakonechny, ulitsa Kuibysheva, 195, kv. 56, Donetsk; Manat Z. Tolymbekov, ulitsa Botanicheskaya, 14, kv. 57, Karaganda; Alexandr G. Ponomarenko, ulitsa Artema, 134, kv. 13; Vladimir N. Radchenko, prospekt Komsomolsky, 17, kv. 18, both of Donetsk; Alexandr A. Bulyanda, ulitsa Nakhimova, 24, kv. 3, Zhdanov; Vladimir G. Mizin, ulitsa Lenina, 23, kv. 27, Chelyabinsk; Gennady Z. Gizatulin, prospekt Stroitelei, 119-a, kv. 44, Zhdanov; Jury F. Vyatkin, ulitsa Pirogova, 202, kv. 24, Moscow, all of U.S.S.R.

[21] Appl. No.: 459,742
[22] PCT Filed: Jul. 26, 1988
[86] PCT No.: PCT/SU88/00146
   § 371 Date: Feb. 23, 1990
   § 102(e) Date: Feb. 23, 1990
[87] PCT Pub. No.: WO90/01071
   PCT Pub. Date: Feb. 8, 1990

[51] Int. Cl.$^5$ .................................................. C21B 7/072
[52] U.S. Cl. ........................................... 75/546; 75/560; 75/567; 75/568
[58] Field of Search ................... 75/546, 560, 567, 568

[56] References Cited

FOREIGN PATENT DOCUMENTS 1298250 3/1987 U.S.S.R. ............................... 75/568

*Primary Examiner*—Melvyn J. Andrews
*Attorney, Agent, or Firm*—Burgess, Ryan & Wayne

[57] ABSTRACT

The invention contemplates smelting in a steelmaking unit a carbon-containing semiproduct, tapping it into a ladle, supplying to the ladle slag-forming materials, a reducer and thermally pretreated oxide materials containing alloying elements. The supply of said oxide materials is started after the tapping of the carbon-containing semiproduct in an amount of minimum 0.25 and maximum 0.5 by mass thereof, is carried out during the tapping of this semiproduct and completed before completing the tapping of the carbon-containing semiproduct. The supply of a reducer is carried out after the supply of said oxide materials and is completed before the end of the tapping of the carbon-containing semiproduct.

5 Claims, No Drawings

METHOD OF PRODUCING GENERAL-PURPOSE STEEL

FIELD OF THE INVENTION

The present invention relates to metallurgy and more particularly to a method of producing general-purpose steel.

The invention can be used in production of converter, open-hearth, and electrical general-purpose steel.

The present invention can be most effectively used in production of manganese-alloyed steel.

BACKGROUND OF THE INVENTION

At present all over the world in production of general-purpose steel use is made of ferroalloys as alloying materials.

The use of ferroalloys requires large energy expenditure since an energy carrier is consumed in great amounts. Besides, the production of ferroalloys is accompanied with the formation of harmful for the environment gases in concentration exceeding maximum permissible levels in the atmosphere according to the international standards.

The production of general-purpose steel with the use of ferroalloys proceeds with high losses of an alloying element and with a low degree of extraction thereof into steel. This is due to the fact that the process of preparing ferroalloys and the process of steel alloying are high-temperature and are accompanied with high losses of the alloying element together with gaseous products of the reaction.

In addition, in the production of ferroalloys there exists a high slag multiplicity also resulting in high losses of the alloying element with the slag.

The degree of extraction of the alloying element from ferroalloys into steel is low since approximately one fifth of the ferroalloy is consumed for deoxidizing of metal.

Known in the art is a method of steel refining by the introduction of oxide materials containing metals, which are alloying for the steel being smelted, into a steel making unit (JP, A, 59-215412).

The known method includes the loading of cast iron into a smelting unit, the subsequent supply of oxide materials containing alloying metals, for instance, manganese, chromium, silicon, molybdenum, vanadium, niobium, and cobalt simultaneously with a carbon-containing material into the same unit, and delivery from below of a gas-oxygen mixture containing 20-70% of oxygen at a flow rate of 0.1 mm$^3$/t·min.

This is accompanied with a decrease in the amount of carbon in the carbon-containing material and with liberation of heat required for heating and melting all the materials introduced into the steelmaking unit.

Besides, a part of the carbon is consumed for the reduction of the alloying elements from the slag which proceeds with high heat losses. As a result, mild steel is obtained.

Since oxide materials are used without a thermal treatment, they contain hydrate moisture and readily dissociating complex compounds of various oxides. When such oxides find their way to the surface or into the bulk of liquid metal, gaseous dissociation products are formed the liberation of which leads to slag foaming and to discharge of the metal and slag from the steelmaking unit.

As a reducer in the known method use is made of carbon-containing materials introduced into the steelmaking unit simultaneously with oxide materials.

It is known that the reaction of carbon with oxygen is endothermal; therefore, to compensate for heat losses in the course of the reduction, an additional heating of liquid metal is required (prior to introducing oxide and carbon-containing materials) up to a temperature higher than that in the method of steel alloying with ferroalloys.

Besides, a simultaneous supply of oxide and carbon-containing materials and a subsequent blowing of liquid metal with an oxygen-containing gaseous mixture results in combustion of carbon in the flow of the gaseous mixture, hence, in an inefficient consumption thereof as a reducer.

The use of the known method does not ensure any certain degree of extraction of the alloying element, for instance, manganese, from the oxide material into steel since it is impossible to predict what amount of the carbon-containing material is consumed for the reduction and what amount is burnt.

Largely, the rational use of manganese in the known method depends on the final carbon content in the steel obtained. If carbon content is less than 0.2%, the manganese extraction degree is no more than 60%.

The known method can be applied only on a limited scale because of the need to have a special steelmaking unit with a bottom blowing, to use as a metal charge an iron cast refined from sulphur, phosphorus, and silicon, the temperature of the iron cast after the completion of the refining process being no more than 1250° C. against 1350°-1400° C. of conversion pig iron, and the use of a high-grade manganese ore with a manganese content of up to 50%.

All of the above features make steel more expensive because of the necessity to use a special steelmaking unit not always justified in production of general-purpose steel, an enhanced consumption of heat carriers to compensate for heat losses in iron cast refining, and expensive high-grade manganese ore.

Known in the art is a method of steel alloying with manganese (SU, A, 104464) involving the smelting of a carbon semiproduct, tapping said semiproduct into a ladle, delivery into the ladle onto the surface of the liquid semiproduct of a thermally pretreated oxide material containing an alloying element. A low-phosphorus manganese slag (LPS) of ferroalloy production, is used as an oxide material, aluminium as a reducer, and lime in an amount ensuring the basicity of the slag equal to 2.0-3.5. Then the surface is blown-out with oxygen for 3-30 s and then blown-through with argon.

This method, however, does not provide steel of a high grade since the oxide material containing manganese as an alloying material (low-phosphorus manganese slag of ferroalloy production), reducer, and lime are delivered into a ladle after tapping the carbon semi-product therein, after which oxygen is fed.

The above-described delivery of the materials into the ladle complicates the control of the steel alloying process and does not ensure the conditions for removing nonmetallic inclusions from the bulk of the liquid metal formed as a result of deoxidizing the carbon semi-product with the reducer. Oxygen supply makes the use of the reducer inefficient and enhances the losses of the reducer on ignition, thereby deteriorating the quality of the final steel due to an increase of the amount of nonmetallic inclusions in the steel.

A simultaneous delivery of the materials into the ladle after tapping the carbon semiproduct therein makes the processes of manganese reduction from the slag melt, deoxidation, and alluminium alloying of the metal also simultaneous. As a result an aluminium-alloyed steel is obtained and there is no possibility to obtain rimming steel.

Besides, a simultaneous delivery of the materials into the ladle after tapping the carbon semiproduct therein decreases the degree of extraction of an alloying element (manganese) fromn the slag melt and makes the use of the reducer inefficient as a result of which the content of manganese in the final steel is lowered.

All the above deteriorates quality of the final steel.

This method does not ensure the preparation of a high-grade rimming steel since:

1) the supply of the reducer into the ladle after tapping the carbon semiproduct is accompanied with deoxidation of the metal which deteriorates the rimming of steel after pouring and, hence, enhances the surface defects of the rolled products prepared from such steel;

2) the argon blowing-through of the metal in the ladle decreases the oxygen content in the steel which also deteriorates the steel quality because of a poor rimming of the metal after pouring;

3) the use of a low-phosphorus manganese slag (LPG) of ferroalloy production as an alloying additive decreases the oxygen content in the steel prior to pouring since LPS has low reducibility. This is due to the fact that LPS contains hardly reducible manganese silicates whose destruction and subsequent reduction of manganese from oxides require a high temperature (of about 1600° C.) and, hence, an additional consumption of energy carrier. The melting of LPS requires an additional time period and in this case the reducer introduced into the ladle is consumed mainly for deoxidation of the carbon semiproduct and to a lesser extent is used for its designated purpose, namely, as a reducer of the alloying element (manganese) from the slag melt.

This results in a decrease in the oxygen content in the steel prior to pouring, and in an increase in the amount of nonmetallic inclusions. After pouring, the rimming of steel deteriorates which worsens the quality of the final steel and enhances rolling defects.

Besides, when using the known method, it is very difficult to prepare steel with narrow concentration limits of manganese and aluminium since the delivery of the oxide material and reducer into the ladle is not regulated with respect to the amount and sequence thereof. According to this method, the reducer and manganese-containing oxide material are delivered just after tapping the carbon semiproduct into the ladel because of which manganese reduction, deoxidation, and alumin-ium alloying of the carbon semiproduct proceed simultaneously. Since all the materials are fed into a metal bath with the unknown and unregulated oxidation level of the carbon semiproduct, the method has the same disadvantages as those observed in the course of usual deoxidation of metal with aluminium, i.e. the assimilation degree of the part of aluminium consumed for metal deoxidation and alloying varies within wide limits. In this case the steel obtained may have both a very low and a very high aluminium content, but it is impossible to prepare steel with a preset aluminium content.

In the known method the consumption of manganese-containing materials is also unregulated which, along with uncontrolled assimilation of aluminium, complicates the preparation of steel with a narrow preset range of manganese content and decreases the grade of the final steel.

In the production of steel by the known method the capacity of the steelmaking unit decreases as compared with the process of steel alloying with manganese ferroalloys since the delivery of all the materials into the ladle just after tapping the carbon semiproduct makes the processes of alloying and melting more prolonged. This leads to a decrease in the capacity and makes steel more expensive.

In addition, the manganese-containing oxide material used in the known method is expensive since it is prepared in electric-arc furnaces, i.e. the production requires a great amount of energy and heavy capital outlays for the equipment. The use of this material, naturally, makes steel more expensive. Low extraction (about 80%) of the alloying element (manganese) and losses of aluminium (more than 20%) because of an inefficient use thereof increase the cost of steel even more.

Besides, the known method provides the preparation of only manganese-alloyed steel whereas steel alloyed with other elements cannot be obtained.

A simultaneous introduction of oxide materials and reducer is accompanied with high losses of the reducer on ignition. This is due to the fact that the reducer is a light material and, reacting with the atmospheric oxygen, accumulates on the surface of the bath of the slag melt since the reducer has a greater affinity to oxygen than the alloying element entering into the composition of the oxide material.

The reducing materials have a lower melting point than the oxide materials containing an alloying element; therefore, being simultaneously introduced onto the liquid metal surface, the reducers melt in the first turn. The density of the reducers is more than two times lower than that of liquid steel; therefore, they melt on the surface of the liquid metal. In the presence of iron oxides on the surface of liquid metal the melting process is usually accompanied with the formation of gaseous products of incomplete oxidation of the reducers. This results in an inefficient consumption of the reducers and in a decrease of the degree of extracting the alloying element from the oxide material into steel, thereby making the production of steel more expensive.

The use of the known method does not allow one to obtain rimming steel since the blowing with argon decreases the oxygen content in steel and deteriorates the quality because of poor rimming in the course of pouring.

In the production of aluminium-alloyed steel by the known method the consumption of a reducer must be considerably enhanced. A rise in the reducer consumption, however, contaminates the metal with nonmetallic inclusions, namely, the products of reduction of oxide materials containing an alloying element. This, in its turn, worsens the quality of the steel produced.

SUMMARY OF THE INVENTION

The invention is based on the problem of providing a method for producing general purpose steel with such a supply of oxide materials and a reducer which allows quality of the resultant steel to be enhanced with a cheaper manufacturing process.

This problem is solved by that in a method of producing general-purpose steel, comprising melting a carbon semiproduct in a steelmaking unit, tapping the product into a ladle, supply into the ladle of slag-forming materials, a reducer, and thermally pretreated oxide materials containing alloying elements, according to the invention, the supply of the thermally pretreated oxide materials begins when the carbon semiproduct is discharged in an amount no less than 0.25 and no more than 0.5 of the total mass thereof, is continued in the course of discharging said semiproduct, and completed prior to the completion of discharging the carbon semiproduct, the supply of the reducer being carried out after the supply of the oxide materials and completed prior to the completion of discharging the carbon semiproduct.

The use of a thermally pretreated oxide material decreases gas-saturation of the steel since in the process of thermal treatment the hydrate moisture is almost completely removed from the oxide material.

A decrease in gas-saturation of the steel in the course of production thereof makes it possible to avoid the subsequent vacuum treatment and other methods of steel processing aimed at lowering the gas content.

A low content of such gases as hydrogen and nitrogen in steel improves the quality of the steel since the flake content and contamination with nitride-phosphorous inclusions decrease sharply.

In addition, in the course of thermal treatment of the oxide material the carbon compounds present in a thermally untreated material are decomposed. Therefore, the use of a thermally treated oxide material in production of steel alloyed with any elements rules out the foaming of the slag melt being formed and the ejection thereof from the ladle and lowers greatly the content of oxide nonmetallic inclusions in the final steel. This improves the quality of steel and eliminates an additional refining of steel from nonmetallic inclusions which makes the process of steel production cheaper.

The supply of thermally pretreated materials in the course of discharging the carbon semiproduct accelerates the melting of the oxide material, favours the formation of a homogeneous slag melt, and prevents the ingress of the oxide material into the bulk of the carbon semiproduct.

The supply of the oxide materials into the ladle in the course of discharging the carbon semiproduct when the carbon semiproduct is discharged in amount no less than 0.25 of the total mass thereof ensures a uniform distribution of the oxide material on the surface of liquid metal.

This is due to the fact that when the ladle is filled with metal for no less than 0.25 of the ladle height, this volume is quite sufficient for the kinetic energy of the carbon semiproduct jet to be completely suppressed inside the bulk of said semiproduct. Therefore, on the surface of the carbon semiproduct there are neither waves nor other perturbations. The upward convective streams of the carbon semiproduct have a relatively low energy and cannot entrain into the bulk of the carbon semiproduct the oxide material possessing a lower density than the carbon semiproduct. In this case there is no intense stirring of the upper layers of the carbon semiproduct which almost completely rules out the formation of a solid metal film on the surface of the oxide material preventing fast melting of the oxide material (further on the formation of such a film is called "metallization" of the oxide material). This prevents the melting of the oxide material in the bulk of the carbon semiproduct and contamination of the semiproduct with nonmetallic inclusions contained in the oxide material which improves quality of steel.

The predetermined supply of a reducer and oxide materials prior to the discharge of a half amount of the carbon semiproduct makes the reduction process effective and ensures a simultaneous termination of the processes of reduction and discharge of the carbon semiproduct which accelerates the production of steel.

This is caused by intense melting of the oxide materials containing an alloying element and of slag-forming materials. As a result, in the slag melt the complexes of acid oxides entering into the composition of the oxide material with oxides of alloying elements decompose, thermodynamically more stable compounds of basic oxides entering into the composition of slag-forming materials with acid oxides are formed and, hence, the activity of the alloying element in the slag melt and the reduction degree thereof enhance. This decreases the reducer consumption for preparation of steel of the preset composition and makes the production of steel cheaper.

Besides, the formation of thermodynamically more stable compounds of basic oxides entering into composition of slag-forming materials with acid oxides entering into composition of the oxide materials improves the quality of the final steel since no silicate nonmetallic inclusions are formed in the bulk of the liquid metal.

The use of any thermally treated oxide materials rules out gas liberation in the course of melting of said materials when they contact with a metal melt and eliminates slag melt foaming. The absence of gaseous products of dissociating oxides in the slag melt favours the effective use of the reducer, decrease the losses of the reducer which can take place during iraction with oxygen of the gaseous products of the dissociated components, makes the process of steel production cheaper since no additional measures aimed at improving labour conditions are required, and eliminates the unjustified consumption of the reducer.

It is expedient to use as a thermally pretreated oxide material manganese-containing oxide material treated preliminary at a temperature of from about 900° to about 1250° C. Manganese is available in the majority of general-purpose steels where a manganese content varies from 0.2 to 2.0 mass %. This widens the possibility of application of the proposed method.

The above-cited temperature of preliminary treatment is chosen because of the fact that the composition of practically all manganese ores used in metallurgical production processes comprise, along with hydrate moisture, carbonate compounds of manganese and of other components. Therefore, the use of the so called "raw" ore in pyrometallurgical processes is accompanied with gas liberation resulting frequency in ejection of slag melt and metal from the smelting unit or ladle. The use of manganese-containing oxide materials thermally treated at a temperature of below 900° C. enhances the consumption of the reducer whose losses increase in the course of gas liberation. This is accompanied with a decrease of the degree of manganese extraction from the slag melt. Besides, this makes the steel more expensive and worsens its quality because of a higher content of nonmetallic inclusions in the final steel.

Thermal treatment of manganese-containing oxide materials at a temperature of 900° C. and higher ensures the decomposition of all carbonate forms of the minerals entering into the composition of the manganese ore and favours the transition of manganese into the oxides with a lower oxygen content, which, in its turn, decreases the consumption of the reducer, increases the extraction of manganese, improves steel quality, and decrease its cost.

Thermal treatment of the manganese-containing oxide materials at a temperature exceeding 1250° C. favors the formation of difficult to reduce manganese silicates such as $Mn_2SiO_4$ (tephroite) or $MnSiO_3$ (rhodonite). Besides, a rise in temperature of thermal treatment increases the melting point of the prepared material which also adversely affects the completion of the reducing process, favors contamination of steel with non-metallic inclusion, i.e. deteriorates steel quality, and ranges the cost of steel.

It is desirable in the production of rimming steel to introduce a manganese-containing oxide material in an amount ensuring the supply of 2.30–3.90 kg manganese per one ton of the carbon semiproduct.

The conventional process of production of rimming steel in any steelmaking unit (usually an oxygen converter or an open-hearth furnace) ensures the smelting of a standard (identical for all types of final steels of different chemical compositions) carbon semiproduct containing 0.05–0.10 mass % carbon and 0.05–0.10 mass % manganese. The adjustment of steel to the preset chemical composition is usually accomplished in the ladle by adding low-silicon (no more than 1.0% Si) carbon ferromanganese which is both alloying and deoxidizing component for rimming steel. The stabilizing effect of carbon ferromanganese with respect to oxygen in the carbon semiproduct was established.

Manganese being a weaker deoxidizer than, for instance, silicon or aluminium, is in production of rimming steel the optimum element ensuring the preparation of high-grade final steel. Usually the manganese content in rimming steel is at the level 0.25–0.40 mass %. Therefore, the introduction into the ladle of a manganese-containing material ensuring 2.30–3.90 kg manganese per ton of the carbon semiproduct with an average extraction of manganese at a level of 75% makes it possible to attain the preset manganese content in the final steel thereby enhancing the quality of the steel and lowering its cost.

When manganese is introduced into the ladle in an amount less than 2.3 kg manganese per one ton of the carbon semiproduct, the content of manganese in the final steel is less than 0.25% which results in a higher oxygen content in the metal, poor rimming of the metal in a mold, poor quality of the final steel, great amount of defects, and higher cost of steel.

The introduction into the ladle of more than 3.9 kg manganese per one ton of the carbon semiproduct is also undesirable, since steel in this case contains a higher amount of manganese prior to pouring and lowered oxygen content and as a result the rimming of the metal after pouring is poor. This worsens the processes of ingot crystallization in the mould, the surface of the rolled products, the quality of the final steel, enhances the amount of defects, and increases the cost of the final steel.

It is desirable in the production of rimming steel to use aluminium as a metal reducer, the consumption thereof being chosen from the mass ratio of the introduced aluminium and manganese contained in the final steel equal to (0.30–0.32):(0.95–1.05), respectively.

As regards the physico-chemical properties, aluminium if efficiently used is one of the most optimum material applied in thermal metal reducing processes. The affinity to oxygen of aluminum is greater than of silicon which enhances the possibility of a more complete extraction of an alloying element from the slag melt. Alumina, the product of aluminum oxidation, decreases the activity of the alloying element in the slag melt to a much lesser extent then silica, the product of silicon oxidation. The use of aluminum as a reducer enhances the thermal stability of the process as compared with silicon and makes it possible to introduce additionally into the slag melt, if necessary, the corresponding slag-forming materials (for instance, lime) without an additional consumption of heat carriers for their melting.

Aluminium as a reducer has certain advantages over such elements as calcium, magnesium, and others having a higher oxygen affinity than aluminium. At temperatures of the metal melt in the ladle equal to 1550°–1620° C. the vapour pressure of calcium and magnesium is high enough and, therefore, the melting of these elements is accompanied with the formation of gaseous products (calcium and magnesium vapours) which are removed from the reduction zone without reacting with oxygen of the corresponding oxide containing an alloying element. A decrease in the activity of calcium and magnesium at such temperature can be ensured by a considerable dilution in the melt, i.e. by the introduction into the melt of a ballast additive, for instance iron or silicon in amounts close to 70–95%. In this case the heating and melting of the ballast additive requires an additional heat consumption which decreases thermal stability of the process of reduction and deteriorates the conditions of a complete extraction of the alloying element from the slag melt.

Carbon and manganese are the necessary elements in the composition of rimming steels whereas silicon and aluminium are most undesirable in addition to usual impurities such as sulphur and phosphorus. Therefore, aluminium consumption in production of rimming steels by the proposed method is chosen from the mass ratio of introduced aluminium and manganese entering into the steel composition equal to (0.30–0.32):(0.95–1.05), respectively.

Such a composition ensures a complete use of aluminium for manganese reduction from the slag melt and is a limiting factor in the developed version of the method. If the consumption of aluminum is less than 0.30:(0.95–1.05), the amount of manganese reduced will be insufficient for the preparation of rimming steel. When the consumption of aluminium is greater, the part of aluminium will be used for deoxidation of the metal as a result of which the oxygen content in steel will be lower than that required. The rimming process of steel upon pouring is poor in both cases which increases amount of defects in rolled products, deteriorates the quality of steel, and enhances its cost.

The manganese content in rimming steels varies from 0.20 to 0.45%. When the consumption of a manganese-containing oxide material is less than the lower limit, the possibility of controlling the alloying process decreases since in this case the amount of manganese oxides rather than of aluminium oxides becomes the limiting factor. This makes possible two versions of unfavourable alloying process: either aluminium incompletely used for reduction will deoxidize steel and decrease the oxygen content below the required limit (this take place when manganese extraction from the slag melt is more complete and the manganese content in steel attains 0.20% or more) or the manganese content in steel will be less than that required if the degree of manganese extraction is within the ordinary limits.

A greater consumption of the manganese-containing material enhances the cost of steel and worsens its quality because of a high manganese content, low oxygen content, poor rimming process after pouring, and increased amount of defects.

The claimed concentration limits of aluminium and manganese, namely, their ratio (0.30–0.32):(0.95–1.05) ensure the preparation of high-grade steel and lower its cost.

It is favourable in production of aluminium-alloyed steel to use aluminium as a metal reducer, the consumption of which is chosen from the mass ratio of the introduced aluminium and manganese entering into the composition of the final steel equal to (0.30–0.32):(0.95–1.05), respectively. It is expedient to begin the delivery of the slag-forming material after the introduction of aluminium used as a reducer and to continue the delivery in the course of tapping the carbon semiproduct into the ladle, and after the completion of tapping the carbon semiproduct to additionally introduce aluminium in amount 0.45–0.85 kg per tone of the carbon semiproduct, blowing-through the melt with a neutral gas.

The main requirement imposed on the material made of aluminium-alloyed steel and meant for cold stamping is the ability of a sheet or strip to deep or very deep drawing when preparing articles of a given shape and dimensions by cold stamping with minimum wastes and low cost of the material. This can be attained when metal possesses high plastic properties, is uniform over the whole bulk of the sheet being stamped, and retains its properties between the rolling and stamping procedures.

The value of the yield point and especially the ratio $(\sigma_1/\sigma_2)$ of the yield point $(\sigma_1)$ to ultimate strength $(\sigma_2)$ affect the ability of steel to deep drawing to the greatest extent than other mechanical properties. A low value of $\sigma_1/\sigma_2$ points to the fact that steel has a considerable plasticity reserve.

As is known, a very good ability of steel to deep drawing is observed when $\sigma_1/\sigma_2$ 0.6, good ability takes place when $\sigma_1/\sigma_2=0.65$–0.75, and poor ability—at $\sigma_1/\sigma_2 > 0.75$.

The improvement of plastic properties of steel depends on optimum chemical composition, mainly, on manganese and aluminium content.

The introduction of an additional amount of aluminium provides an optimum manganese and aluminium content in the final steel which ensures the best plasticity of metal, i.e. a minimum amount of defects in rolled and stamped articles made of this steel.

The claimed technology provides a high yield of the metal with improved quality and decreases the cost of the metal due to the attainment of preset aluminium and manganese content in steel.

In the proposed version aluminium for manganese reduction, deoxidation, and alloying of steel is fed in two portions. This makes it possible to stabilize the oxidation level of the metal in the ladle prior to delivery of the second portion of aluminium. After the delivery of the first portion of aluminium, the reaction of manganese reduction from the melting manganese-containing oxide materials is predominant in the ladle, the consumption of aluminium for metal deoxidation being much lower than for the reduction process.

This is due to the fact that the amount of oxygen contained in the slag and consumed in the source of reduction for aluminium oxidation is by 1.5–2.0 orders of magnitude greater than in the metal.

Even if it is assumed that the rates of manganese reduction and metal deoxidation are equal, the fraction of the aluminous reaction products being formed in the metal bulk is by 1.5–2.0 orders of magnitude lower than at the slag-metal interface, i.e. in the zone of the reduction reaction. In other words the content of $Al_{total}$ in metal after the delivery of the first portion of aluminium into the ladle must be on the level of traces.

After the manganese reduction, the metal is blown-through with an inert gas for averaging the chemical composition of the molten metal in manganese and oxygen.

The introduction of additional aluminium into the melt deoxidizes the melt completely and ensures the preparation of the final steel with a preset aluminium content.

After the completion of tapping the carbon semiproduct into the ladle, the reduction of the alloying elements from the oxides thereof is ended. This makes the conditions for steel alloying with aluminium favourable since to the moment of introduction of additional aluminium into the ladle the metal is almost completely deoxidized to the values of oxygen content corresponding to that in the final steel. Therefore, aluminium introduced into the metal is consumed in this case only for the alloying procedure.

The supply of additional aluminium in amount less than 0.45 kg/t does not ensure the required property of the metal and more than 0.85 kg/t enhances aluminium content in steel which is also undesirable.

The blowing-through of the melt with a neutral gas provides a uniform distribution of additional aluminium in the bulk of the metal.

The introduction of slag-forming materials after the delivery of the first portion of aluminium increases the manganese activity in the slag melt, improves the reduction process, ensures the manganese content in the final steel within the narrow concentration limits, improves the quality of the final steel, decreases the amount of defects in rolled and stamped articles made of the steel prepared.

The proposed process improves quality of the final steel and decreases the cost of metal due to guaranted attainment of a preset aluminium and manganese content in the final steel.

The use of the proposed method of producing general-purpose steel ensures the production of said steel without the application of ferroalloys, improves the quality of the final steel, and makes the production process cheaper.

DETAILED DESCRIPTION OF THE INVENTION

The proposed method can be used for producing general-purpose steel containing, mass %:

| | |
|---|---|
| carbon | 0.05–0.5 |
| manganese | 0.25–2.5. |
| iron | the balance. |

Besides, general-purpose steel may also contain, mass %:

| | |
|---|---|
| silicon | up to 0.6 |
| aluminium | up to 0.08 |
| chromium | up to 2 |
| vanadium | up to 0.2 |
| titanium | up to 0.2 | and other elements.

A method of producing general-purpose steel is accomplished in the following way.

In any known steel-making unit (an open-hearth furnace, electrical furnace, a converter with upper, bottom, or combined blowing-through with oxygen, gas-oxygen mixtures, neutral, and other gases) a carbon semiproduct is smelted having, for instance, the following composition (mass %):

| | |
|---|---|
| carbon | 0.05-0.3 |
| manganese | 0.05-0.10 |
| silicon | traces |
| aluminium | traces |
| sulphur | up to 0.30 |
| phosphorus | up to 0.025. |

A choice by the proposed method of steelmaking unit for preparing a carbon semiproduct is dictated by the requirement imposed on the general-purpose steel being produced and can be made by the plant producing the final steel.

The carbon semiproduct obtained in the steelmaking unit is tapped into the ladle with the capacity corresponding to or multiple of to that of the steelmaking unit.

In the course of tapping the carbon semiproduct, the slag-forming materials are fed into the ladle (lime, dolomite, fluorite, and/or others).

As the ladle becomes filled with the carbon semiproduct in amount no less than 0.25 and no more than 0.5 of the mass of the carbon semiproduct, a thermally pretreated oxide material containing the alloying elements is delivered during the tapping of the carbon semiproduct.

As oxide materials containing the alloying elements use can be made of manganese-containing materials as well as chromium-, vanadium-titanium-containing and other materials which are supplied into the ladle separately or in combination depending on a preset chemical composition of the final steel.

The supply of the thermally pretreated oxide materials containing the alloying elements is ended prior to the completion of tapping the carbon semiproduct into the ladle.

After the supply of the oxide materials containing the alloying elements, the reducer, for instance, aluminium-, calcium-, silicon-, or titanium-based alloys and the like, is supplied into the ladle.

The supply of the reducer into the ladle is ended prior to the completion of tapping of the carbon semiproduct. As a result, the steel of a preset chemical composition is obtained.

The use of thermally pretreated oxide materials rules out the foaming of the slag melt in the ladle and prevents slopping and splashing of metal and slag from the ladle in the course of filling the ladle with the carbon semiproduct.

A smooth progress of the reduction process and an almost complete absence of the hydrate moisture in the thermally pretreated oxide materials containing the alloying elements made it possible to considerably decrease hydrogen and nitrogen content in the steel and the amount of nonmetallic inclusions formed in the course of foaming the melt slag, thereby improving the quality of the final steel.

The process of reduction of the alloying elements from thermally pretreated oxide materials fed into the ladle is short and ends with the completion of tapping the carbon semiproduct into the ladle. The degree of extraction of the alloying element from the oxide material into steel attains 90-97% which greatly exceeds the corresponding value obtained when ferroalloys are used. All the above makes the prepared steel cheaper.

The beginning of the supply into the ladle of thermally pretreated oxide materials containing the alloying elements after tapping the carbon semiproduct in an amount no less than 0.25 but no more than 0.5 of the mass thereof and the end of the supply prior to the completion of tapping the carbon semiproduct as well as the supply of the reducer after the supply of the oxide materials prior to the completion of tapping the carbon semiproduct ensures a simultaneous conduct of melting of the oxide materials containing the alloying elements, melting of the reducer, and reduction of the alloying elements from the slag melt. In addition, such a process favours an intense reduction of the alloying elements from the oxide materials and a simultaneous completion of the reduction process and of tapping the carbon semiproduct into the ladle, thereby improving the quality of the steel and making the steel cheaper.

If thermally pretreated oxide materials containing the alloying elements are delivered into the lade after tapping the carbon semiproduct in amount less than 0.25 of the total mass thereof, the so called "metallization" of the oxide material take place residing in the formation of a solid metallic film on the surface of the oxide material.

This is due to the fact that at the beginning of tapping the carbon semiproduct into the ladle the dropping jet of the carbon semiproduct possesses a high kinetic energy as a result of which intense convective streams of the carbon semiproduct are formed in the ladle, said streams being able to involve into the bulk the materials (oxide materials containing the alloying elements) with a density lower than that of the carbon semiproduct. The ingress of the oxide materials into the bulk of the carbon semiproduct favours the formation on the surface of said materials of a solid metallic film ("metallization") which hinders the melting of the oxide materials. As a result, the conditions of melting the oxide materials become worse, the melting rate decreases, and the conditions of the reduction of the alloying elements deteriorate. The reduction process becomes hardly controllable.

Besides, an inefficient use of the reducer enhances the losses thereof since the reducer is partially consumed for the reaction with atmospheric oxygen.

Becoming "metallized", the part of the oxide material melts in the bulk of the carbon semiproduct, contaminating the steel with nonmetallic inclusions and deteriorating the quality thereof.

Besides, the "metallized" part of the oxide materials does not participate in the reduction process and, therefore, the total consumption of thermally pretreated oxide materials containing the allying elements must be increased for producing steel with a preset chemical composition.

The supply into the ladle of thermally pretreated oxide materials containing the alloying elements prolongs the process of steel alloying. This is due to the fact that for the described delivery of the oxide materials into the ladle the alloying process is limited by the diffusion of the oxide components and of the reduction products into the reaction zone, i.e. by the kinetic conditions of the reaction depending, in turn, on many parameters: temperature, stirring of the metal and slag, and others.

To increase the rate of reduction of the alloying elements from the oxide materials, it is needed to accelerate the melting of the oxide materials which requires an additional heat expenditure and consumption of energy carriers. An additional intense stirring of the metal is also required for an accelerated removal from the reaction zone of metallic products, namely, alloying elements, and for a uniform distribution thereof in the metal along the height of the ladle.

For this purpose the steel-pouring ladles must be fitted with special devices for stirring the metal or the stirring can be performed on special devices designed for adjusting the metal to a preset chemical composition and temperature.

Besides, the elongation of the alloying process in the ladle cause an enhanced consumption of the reducer since the reducers used usually in practice have both melting point and density lower than thermally protreated oxide materials containing the alloying elements whereas their oxygen affinity is higher than that of the alloying elements. As a result, the reducers introduced into the ladle melt faster than the oxide materials and their local concentration in the slag-metal melt increases which leads to the emersion of the molten reducer onto the surface of the slag melt and to the subsequent combustion thereof because of the reaction with atmospheric oxygen. A certain part of the reducer is consumed for the interaction with oxygen dissolved in the bulk of the carbon semiproduct which enhances the amount of non-metallic inclusions in the final steel and deteriorates the quality of the steel. All the above makes the steel more expensive.

The supply of the reducer into the ladle prior to the completion of tapping the carbon semiproduct ensures a simultaneous end of the reduction process and of tapping the carbon semiproduct into the ladle and provides the preparation of a high-grade final steel.

The supply of the reducer into the ladle after the end of tapping the carbon semiproduct, as was already mentioned above, increases the consumption of the reducer since the reduction proceeds in this case under the kinetic conditions and results in contamination of steel with oxide nonmetallic inclusions, i.e. deteriorates quality of the final steel.

It is expedient to use a metallic reducer as a reducing agent.

A choice of the metallic reducer is dictated by the necessity to perform the process of steel alloying with the use of oxide materials containing an alloying element in an exothermal regime, i.e. with heat liberation. When the process of steel alloying is carried out in the ladle, an additional heat is required for heating and melting the oxide materials introduced into the ladle.

If the reaction of reducing the alloying elements from oxide materials proceeds with heat absorption (endothermal reaction), deficit heat must be compensated by other means, for instance, by additional heating the carbon semiproduct in a steelmaking unit, special heating the carbon semiproduct in the ladle by the electric arc or any other method, by using exothermal mixtures additionally introduced into the ladle, or by other means.

However, an additional heating of the carbon semiproduct in a steelmaking unit is related not only to additional consumption of energy carriers but, as in the case of preparing a carbon semiproduct, for instance, in an oxygen converter, to additional consumption of crude ion and deteriorates quality of the final steel. This is due to the fact that a rise in temperature of the carbon semiproduct prior to tapping thereof from the steelmaking unit is related to an increase of the oxygen content in the carbon semiproduct. The removal of an additional oxygen from the carbon semiproduct requires an additional amount of the deoxidizer which, in its turn, enhances the amount of nonmetallic inclusions in the steel, worsens quality of the final steel, and makes it more expensive.

An additional heating of the carbon semiproduct in the ladle by the electric arc or other method requires a special equipment and an additional consumption of energy carriers (for instance, electrical energy) and, hence, makes the final steel more expensive which is not always justified in production of general-purpose steel.

The use of exothermal mixtures also makes the steel more expensive and worsens its quality because of an increased amount of nonmetallic inclusions which are the products of exothermal reactions.

The use of nonmetallic materials as a reducer is less expedient since, for instance, carbon-containing materials in the reducing processes favour heat absorption which worsens quality of the final steel and makes it more expensive; the reducers containing nonmetallic components as exothermal additives are also less expedient since their use, as was mentioned above, deteriorates quality of the final steel and makes it more expensive.

On the basis of the above it is expedient in accomplishing the hereinproposed method to use a metallic reducer which does not introduce into steel such an impurity as sulphur and, hence, after the completion of tapping a carbon semiproduct into the ladle it is not required to perform an additional operation of deep desulphurization of steel. This makes the steel cheaper.

In production of magnanese steel of any chemical composition as an oxide material use is made of a manganese-containing oxide material which is preliminary subjected to a thermal treatment at 900°–1250° C.

A choice of such oxide material containing manganese as an alloying material was dictated by that almost all types of general-purpose steels contain manganese in amounts varying within the limits from 0.25 to 2.5%.

The temperature limits of thermal treatment equal to 900°–1250° C. are based on the necessity to remove hydrate moisture from the oxide material since the presence of hydrate moisture, as was mentioned above, leads to slag foaming in the course of steel alloying, splashing of metal and slag from the ladle and enhances the contamination of the final steel with such gases as hydrogen and nitrogen which deteriorates quality of the steel.

In addition, thermal treatment of the oxide manganese-containing containing material at the above temperature facilitates decomposition of the carbonate compounds in manganese-containing oxide materials which, similarly to hydrate moisture, favour the foaming of the slag, splashing of metal and slag from the ladle, and enhance the hydrogen and nitrogen content in the final steel and the amount of non-metallic inclusions. This deteriorates quality of the final steel and makes it more expensive since additional measures are required aimed at steel refining from gases and a decrease in the amount of nonmetallic inclusions.

If oxide materials containing manganese in the form of $MnO_2$ (pyrolusite), $Mn_3O_4$ (hausmannite) or as carbonates $MnCO_3$, $CaCO_3$, and others are used without a thermal treatment or are treated at a temperature of below 900° C., their delivery into the ladle is accompanied with decomposition of oxide and carbonate components with the formation of gaseous carbon oxide and dioxide. Gaseous products of decomposition of the oxide material foam the melt slag in the ladle and favour the splashing of metal and slag from the ladle. Besides, they flavour the transfer of oxygen from the atmosphere into the bulk of the slag-metal melt, increase the amount of nonmetallic inclusions in the final steel, deteriorate quality of the final steel, and make it more expensive.

Thermal treatment of the oxide manganese-containing material at temperatures below 900° C. does not provide a complete removal of hydrate moisture the presence of which also worsens the quality of the final steel, contaminating the steel with nonmetallic inclusions, nitrogen, and hydrogen.

It is not expedient to carry out thermal treatment of the manganese-containing oxide material at a temperature of above 1250° C. since at such temperatures the melting of the oxide material takes place which changes physico-chemical characteristics of the oxide material, in particular, increases the melting point. Further on this elongates the reduction process in the ladle and makes it inefficient after the completion of tapping the carbon semiproduct into the ladle.

In the production of rimming steel a manganese-containing oxide material is fed into the ladle in amount ensuring the introduction of 2.30–3.90 kg of manganese per ton of the carbon semiproduct.

This allows one to produce high-grade steel with a preset content of manganese distributed uniformly along the height of the ladle, ensure normal rimming process of the metal in a mold after pouring the steel, and to enhance the yield of the final product.

If the specific consumption of the oxide manganese-containing material is less than 2.3 kg of manganese per ton of the carbon semiproduct, the required manganese content in the final steel responsible to a great extent for the needed oxygen amount in the steel prior to pouring becomes lowered thereby affecting quality of the end metal.

The final steel in this case is characterized by an enhanced oxygen content, poor rimming process after pouring, violation of the formation of a rim in the course of crystallization which worsens the surface of the rolled products and enhances the amount of defects. The final steel is of a poor grade.

A rise in the specific consumption of the oxide manganese-containing material up to the values exceeding 3.90 kg per ton of the carbon semiproduct results in an increased manganese content in the final steel and, hence, in a lowered oxygen content in liquid steel prior to pouring to the values below limiting ones ensuring a normal rimming process in a mold and preparation of a high-grade rolled stock. Weak rimming process does not provide a complete removal of nonmetallic inclusions and gases from the bulk of the liquid metal, quality of the rolled products deteriorates, and the final steel becomes more expensive.

In the production of rimming steel aluminium was used as a reducer in an amount chosen from the mass ratio of the introduced aluminium and manganese entering into the composition of the prepared steel equal to (0.30–0.32):(0.95–1.05), respectively.

The supply of aluminium into the ladle was ended prior to the completion of tapping the carbon semiproduct.

The chosen mass ratios of aluminium and manganese are dictated by the following specific features of the reduction process in the ladle during production of rimming steel.

A high intensity of the reduction process, a simultaneous progress of such processes as oxide material and reducer melting and manganese reduction, a simultaneous completion of manganese reduction and tapping the carbon semiproduct into the ladle made possible an efficient use of aluminium. Aluminium in this case is almost completely consumed for manganese reduction; it reacts neither with oxygen dissolved in the carbon semiproduct nor with atmospheric oxygen. This enhances quality of rimming steel because of elimination from the composition of primary oxide nonmetallic alumina inclusions (the products of aluminium interaction with oxygen dissolved in the carbon semiproduct) and makes the final steel cheaper due to an efficient use of aluminium without the application of manganese ferroalloys for alloying.

The specific consumption of the delivered aluminium less than 0.30 to (0.95–1.05) of manganese entering into the composition of the final steel is insufficient for attaining the preset manganese content in rimming steel which results in a high oxidation degree of the steel, poor rimming in the mould after pouring, increased amount of defects, and poor quality of the final steel. Therefore, to improve the quality of rimming steel, the manganese content must be increased. If, however, the manganese content in the steel is enhanced by adding manganese ferroalloys into the ladle, the cost of steel increases.

If the specific consumption of the delivered aluminium is more than 0.32:(0.95–1.05) of manganese entering into the composition of the final steel, the part of aluminium is consumed for the reaction with oxygen dissolved in the bulk of the carbon semiproduct and as a result the rimming process of steel in the mould after pouring becomes weak, the content of primary oxide alumina nonmetallic inclusions (the products of aluminium oxidation) in the final steel increases, the quality of the final steel deteriorates, the amount of defects increases, and the cost of the steel rises.

Similar negative phenomena are also observed when aluminium is supplied into the ladle after the completion of tapping the carbon semiproduct therein.

In the production of aluminium-alloyed steel aluminium is used as a reducer in the same ratio with manganese as in production of rimming steel and after tapping the carbon semiproduct into the ladle an additional amount of aluminium is introduced in amount 0.45–0.85 kg per ton of the carbon semiproduct.

An additional introduction of aluminium is dictated by the necessity to produce steel with a preset aluminium content and to consume aluminium efficiently.

As the process of tapping the carbon semiproduct into the ladle becomes completed, manganese reduction from the manganese-containing oxide material also comes to an end. Therefore, aluminium introduced additionally into the ladle is consumed, mainly, for steel alloying. This makes it possible to produce steel with a preset aluminium content and eliminate contamination of steel with alumina nonmetallic inclusions due to the efficient use of aluminium. As a result, quality of the final steel improves and the cost decreases.

Useful use of aluminium introduced additionally into the ladle after the completion of tapping the carbon semiproduct is 93-97%.

The consumption of additional aluminium in an amount less than 0.45 kg/t does not ensure the required quality of the metal and more than 0.85 kg/t increases aluminium content in steel which is also undesirable.

In the production of aluminium-alloyed steel, after manganese reduction, the metal is blown-through with an inert gas, for instance, with argon for averaging the chemical composition of molten metal with respect to manganese and oxygen.

The blowing-through of the melt with argon after the introduction of additional aluminium ensures a uniform distribution of aluminium in the bulk of the liquid metal which enhances the quality of the final steel, decreases the amount of defects in rolled and stamped products made of the final steel.

In this case the slag-forming materials are fed after the supply of the first portion of aluminium. This increases the basicity of the slag, enhances the activity of manganese in the slag melt, and accelerates manganese reduction from the oxide material. As a result the manganese content in the final steel attains the preset value and the quality of the steel improves.

EMBODIMENTS

Example 1

Production of Chromium-Alloyed Steel

The method of producing steel was accomplished in a 350 t oxygen converter and the metal was adjusted to a preset chemical composition in the ladle.

Table 1 illustrates fifteen examples of producing chromium-alloyed steel; process parameters corresponding to the claimed process and those that depart from the scope of the claimed process are given.

TABLE 1

| | Time of introduction of oxide material, the fraction of carbon semiproduct (c.s.) being tapped | | Time of introducing the reducer | | Type of | Chemical composition of carbon semiproduct, mass % | | |
|---|---|---|---|---|---|---|---|---|
| No. | beginning | end | beginning | end | reducer | C | Si | Mn |
| 1 | 2 | 3 | 4 | 5 | 6 | 7 | 8 | 9 |
| 1 | 0.2 of the total mass of c.s. | prior to the completion of tapping c.s. | after oxide material | prior to the completion of tapping c.s. | Al-based alloy | 0.08 | traces | 0.06 |
| 2 | 0.25 | prior to the completion of tapping c.s. | after oxide material | prior to the completion of tapping c.s. | Al-based alloy | 0.09 | " | 0.08 |
| 3 | 0.35 | prior to the completion of tapping c.s. | after oxide material | prior to the completion of tapping c.s. | Al-based alloy | 0.09 | " | 0.07 |
| 4 | 0.5 | prior to the completion of tapping c.s. | after oxide material | prior to the completion of tapping c.s. | Al-based alloy | 0.10 | " | 0.07 |
| 5 | 0.6 | prior to the completion of tapping c.s. | after oxide material | prior to the completion of tapping c.s. | Al-based alloy | 0.08 | " | 0.07 |
| 6 | 0.2 | prior to the completion of tapping c.s. | after oxide material | prior to the completion of tapping c.s. | Al-based alloy | 0.08 | " | 0.08 |
| 7 | 0.6 | prior to the completion of tapping c.s. | after oxide material | prior to the completion of tapping c.s. | Al-based alloy | 0.09 | " | 0.08 |
| 8 | 0.35 | after the completion of tapping c.s. | after oxide material | prior to the completion of tapping c.s. | Al-based alloy | 0.10 | " | 0.08 |
| 9 | 0.35 | prior to the completion of tapping c.s. | prior to oxide material | prior to the completion of tapping c.s. | Al-based alloy | 0.09 | " | 0.08 |
| 10 | 0.35 | prior to the completion of tapping c.s. | after oxide material | after the completion of tapping c.s. | Al-based alloy | 0.10 | " | 0.08 |
| 11 | 0.35 | prior to the completion of tapping c.s. | after oxide material | prior to the completion of tapping c.s. | alloy-based on rare-earth metals | 0.09 | " | 0.06 |
| 12 | 0.35 | prior to the completion of tapping c.s. | after oxide material | prior to the completion of tapping c.s. | silicon-based alloy | 0.1 | " | 0.07 |
| 13 | 0.35 | prior to the completion of tapping c.s. | after oxide material | prior to the completion of tapping c.s. | calcium-based alloy | 0.09 | " | 0.08 |
| 14 | 0.35 | prior to the completion of tapping c.s. | after oxide material | prior to the completion of tapping c.s. | titanium-based alloy | 0.09 | " | 0.07 |
| 15 | 0.35 | prior to the completion of tapping c.s. | after oxide material | prior to the completion of tapping c.s. | carbon | 0.1 | " | 0.07 |
| | Chemical composition of c.s., mass % | | | | | Chemical composition of final steel, % | | |

TABLE 1-continued

| No. 1 | S 10 | P 11 | Al 12 | Cr 13 | Ni 14 | Cu 15 | C 16 | Si 17 | Mn 18 |
|---|---|---|---|---|---|---|---|---|---|
| 1 | 0.018 | 0.013 | traces | 0.10 | 0.71 | 0.55 | 0.08 | 1.07 | 0.72 |
| 2 | 0.017 | 0.012 | " | 0.10 | 0.70 | 0.53 | 0.09 | 1.05 | 0.72 |
| 3 | 0.017 | 0.013 | " | 0.13 | 0.68 | 0.55 | 0.09 | 1.02 | 0.73 |
| 4 | 0.019 | 0.013 | " | 0.10 | 0.69 | 0.53 | 0.10 | 1.08 | 0.72 |
| 5 | 0.018 | 0.011 | " | 0.09 | 0.7 | 0.52 | 0.08 | 1.09 | 0.70 |
| 6 | 0.019 | 0.012 | " | 0.08 | 0.67 | 0.57 | 0.08 | 1.07 | 0.74 |
| 7 | 0.020 | 0.011 | " | 0.10 | 0.72 | 0.51 | 0.09 | 1.06 | 0.72 |
| 8 | 0.020 | 0.013 | " | 0.08 | 0.7 | 0.55 | 0.10 | 1.05 | 0.69 |
| 9 | 0.021 | 0.010 | " | 0.12 | 0.73 | 0.52 | 0.09 | 1.03 | 0.70 |
| 10 | 0.020 | 0.011 | " | 0.10 | 0.70 | 0.55 | 0.10 | 1.02 | 0.71 |
| 11 | 0.019 | 0.013 | " | 0.11 | 0.67 | 0.54 | 0.09 | 1.03 | 0.72 |
| 12 | 0.018 | 0.012 | " | 0.09 | 0.72 | 0.51 | 0.10 | 1.10 | 0.74 |
| 13 | 0.017 | 0.012 | " | 0.08 | 0.70 | 0.50 | 0.09 | 1.09 | 0.68 |
| 14 | 0.019 | 0.012 | " | 0.09 | 0.73 | 0.56 | 0.09 | 1.03 | 0.69 |
| 15 | 0.017 | 0.010 | " | 0.10 | 0.72 | 0.48 | 0.50 | 1.05 | 0.7 |

| | Chemical composition of the final steel, mass % | | | | | | Degree of chromium | Value of nonmetallic inclusions | | |
|---|---|---|---|---|---|---|---|---|---|---|
| No. 1 | S 19 | P 20 | Al 21 | Cr 22 | Ni 23 | Cu 24 | extraction, % 25 | oxides 26 | sulphides 27 | silicates 28 |
| 1 | 0.019 | 0.013 | 0.025 | 0.6 | 0.71 | 0.55 | 62.5 | 3.3 | 4.3 | 2.3 |
| 2 | 0.018 | 0.012 | 0.027 | 0.87 | 0.70 | 0.53 | 96.2 | 1.5 | 1.8 | 1.9 |
| 3 | 0.018 | 0.013 | 0.023 | 0.9 | 0.68 | 0.55 | 96.2 | 1.6 | 1.7 | 2.0 |
| 4 | 0.019 | 0.013 | 0.026 | 0.87 | 0.69 | 0.53 | 96.2 | 1.7 | 1.8 | 1.8 |
| 5 | 0.018 | 0.011 | 0.025 | 0.49 | 0.70 | 0.52 | 50.0 | 3.5 | 4.0 | 2.6 |
| 6 | 0.020 | 0.012 | 0.024 | 0.45 | 0.67 | 0.57 | 46.2 | 3.5 | 4.1 | 2.5 |
| 7 | 0.021 | 0.011 | 0.021 | 0.56 | 0.72 | 0.51 | 57.5 | 3.6 | 3.9 | 2.7 |
| 8 | 0.020 | 0.013 | 0.021 | 0.48 | 0.70 | 0.55 | 50.0 | 3.7 | 3.7 | 2.3 |
| 9 | 0.021 | 0.010 | 0.023 | 0.48 | 0.73 | 0.52 | 45.0 | 3.6 | 3.9 | 2.6 |
| 10 | 0.021 | 0.011 | 0.021 | 0.68 | 0.70 | 0.55 | 72.5 | 3.4 | 3.8 | 2.6 |
| 11 | 0.019 | 0.013 | 0.026 | 0.9 | 0.67 | 0.54 | 98.7 | 3.0 | 4.1 | 2.7 |
| 12 | 0.019 | 0.012 | 0.029 | 0.84 | 0.72 | 0.51 | 93.7 | 3.2 | 4.1 | 2.6 |
| 13 | 0.017 | 0.012 | 0.027 | 0.87 | 0.70 | 0.50 | 98.7 | 3.6 | 3.9 | 2.4 |
| 14 | 0.02 | 0.012 | 0.020 | 0.85 | 0.73 | 0.56 | 95.0 | 3.6 | 4.4 | 2.4 |
| 15 | 0.023 | 0.010 | 0.023 | 0.16 | 0.72 | 0.48 | 7.5 | 3.4 | 4.7 | 2.6 |

Iron is the balance in the chemical composition of carbonaceous semiproduct and final steel in all examples.

As a chromium-containing oxide material use was made of converter slag of the following chemical composition, mass %: 70.84 $Cr_2O_3$; 12.13 FeO; 9.35 $Al_2O_3$: 5.94 $SiO_2$: 1.74 MgO.

As slag-forming material use was made of lime containing (mass %) CaO (92) and MgO (6.5) and fluorite.

As a metallic reducer use was made of alloys based on aluminium, rate earths, silicon, calcium, or titanium. Carbon was also used as a nonmetallic reducer.

The chromium-containing material was thermally pretreated at a temperature of 1600° C.

After preparation in the converter of a carbon semiproduct and attaining the temperature of the metal equal to 1640° C., the carbon semiproduct was tapped for 6 min into a steel-pouring ladle lined with fire-clay.

In the course of tapping the carbon semiproduct as the ladle became filled with said product in amount from 0.2 to 0.6 of the total mass thereof, chromium-containing oxide material (13.5 t), lime (1.5 t), and fluorite (0.02 t) were fed into the ladle. Then the reducer was introduced in amount required for reduction of chromium.

The alloying process was ended with the completion of tapping the metal into the ladle.

The metal obtained was then poured on a machine for continuous casting (MCC) to slabs with a cross-section of 250×1550 mm rolled to plates 10-30 mm thick.

Technical parameters of the method are given in Table 1.

The metal obtained was characterized by a lower content of nonmetallic inclusions and, hence, better quality as compared to known methods.

The examples shown in Table 1 differ by the reducers being used namely, alloys based on rare earths, silicon, calcium, or titanium; use was also made of a nonmetallic reducer—carbon.

Besides, the examples are characterized by different moments of introducing oxide materials and reducer depending on the amount of carbon semiproduct tapped into the ladle.

Technical parameters of the examples are given in Table 1.

The infringement of the claimed features on time of introducing an oxide material and a reducer results in violation of the preset chemical composition, hence, in deterioration of quality of the metal. The use of a nonmetallic reducer (carbon) is responsible for a lower degree of chromium extraction from the oxide material and results in carburization of metal above the required value and, hence, in deterioration of quality of the final steel.

From Table 1 it is seen that the most optimum results (such as the least contamination of steel with nonmetallic inclusions and a high degree of extraction of the alloying element) were obtained in the experiments conducted by the proposed method of producing general-purpose steel (examples 2, 3, and 4).

Example 2

Production of Killed Steel

Killed steel was produced in a 350 t oxygen converter and the metal was adjusted to a preset chemical composition in a steel-pouring ladle.

Table 2 illustrates thirteen examples of producing killed steel; process parameters corresponding to the claimed process and those that depart from the scope of the claimed process are given.

Preliminary thermal treatment of the oxide material was performed at a temperature of from 800° to 1350° C.

After preparation of a carbon semiproduct and attain-

TABLE 2

| No. 1 | Time of introduction of oxide material; the fraction of carbon semiproduct (c.s.) being tapped | | Time of introducing the reducer | | Temperature of thermal treatment, °C. 6 | Chemical composition of carbon semiproduct, mass % | |
|---|---|---|---|---|---|---|---|
| | beginning 2 | end 3 | beginning 4 | end 5 | | C 7 | Mn 8 |
| 1 | 0.2 of the total mass of c.s. | prior to the completion of tapping c.s. | after oxide material | prior to the completion of tapping c.s. | 800 | 0.06 | 0.06 |
| 2 | 0.25 | prior to the completion of tapping c.s. | after oxide material | prior to the completion of tapping c.s. | 900 | 0.05 | 0.05 |
| 3 | 0.35 | prior to the completion of tapping c.s. | after oxide material | prior to the completion of tapping c.s. | 1100 | 0.05 | 0.05 |
| 4 | 0.5 | prior to the completion of tapping c.s. | after oxide material | prior to the completion of tapping c.s. | 1250 | 0.06 | 0.05 |
| 5 | 0.6 | prior to the completion of tapping c.s. | after oxide material | prior to the completion of tapping c.s. | 1350 | 0.06 | 0.06 |
| 6 | 0.2 | prior to the completion of tapping c.s. | after oxide material | prior to the completion of tapping c.s. | 1100 | 0.06 | 0.06 |
| 7 | 0.6 | prior to the completion of tapping c.s. | after oxide material | prior to the completion of tapping c.s. | 1100 | 0.07 | 0.06 |
| 8 | 0.35 | after the completion of tapping c.s. | after oxide material | prior to the completion of tapping c.s. | 1100 | 0.07 | 0.06 |
| 9 | 0.35 | prior to the completion of tapping c.s. | after oxide material | prior to the completion of tapping c.s. | 1100 | 0.06 | 0.05 |
| 10 | 0.35 | prior to the completion of tapping c.s. | prior to oxide material | prior to the completion of tapping c.s. | 1100 | 0.07 | 0.05 |
| 11 | 0.35 | prior to the completion of tapping c.s. | after oxide material | after the completion of tapping c.s. | 1100 | 0.05 | 0.05 |
| 12 | 0.35 | prior to the completion of tapping c.s. | after oxide material | prior to the completion of tapping c.s. | 800 | 0.05 | 0.05 |
| 13 | 0.35 | prior to the completion of tapping c.s. | after oxide material | prior to the completion of tapping c.s. | 1350 | 0.06 | 0.06 |

| No. 1 | Chemical composition of carbon semiproduct, mass % | | | | Chemical composition of the final steel, mass % | | | | | | Degree of manganese extraction, % 19 | Value of nonmetallic inclusions | | |
|---|---|---|---|---|---|---|---|---|---|---|---|---|---|---|
| | Si 9 | S 10 | P 11 | Al 12 | C 13 | Mn 14 | Si 15 | S 16 | P 17 | Al 18 | | oxides 20 | sulphides 21 | silicates 22 |
| 1 | traces | 0.020 | 0.01 | traces | 0.18 | 0.33 | 0.20 | 0.021 | 0.011 | 0.032 | 49.1 | 3.4 | 4.4 | 2.8 |
| 2 | " | 0.021 | 0.010 | " | 0.17 | 0.57 | 0.21 | 0.022 | 0.010 | 0.030 | 94.5 | 1.4 | 1.8 | 1.9 |
| 3 | " | 0.019 | 0.009 | " | 0.18 | 0.56 | 0.21 | 0.019 | 0.010 | 0.031 | 92.7 | 1.3 | 1.9 | 1.8 |
| 4 | " | 0.020 | 0.010 | " | 0.18 | 0.57 | 0.20 | 0.020 | 0.010 | 0.030 | 94.5 | 1.4 | 1.9 | 1.9 |
| 5 | " | 0.019 | 0.011 | " | 0.19 | 0.39 | 0.19 | 0.020 | 0.011 | 0.031 | 60.0 | 3.3 | 4.5 | 2.6 |
| 6 | " | 0.020 | 0.011 | " | 0.17 | 0.38 | 0.19 | 0.020 | 0.011 | 0.032 | 58.2 | 3.0 | 4.2 | 3.0 |
| 7 | " | 0.020 | 0.010 | " | 0.18 | 0.39 | 0.20 | 0.020 | 0.010 | 0.030 | 60.0 | 3.6 | 4.0 | 2.7 |
| 8 | " | 0.021 | 0.010 | " | 0.17 | 0.42 | 0.21 | 0.021 | 0.010 | 0.028 | 65.4 | 3.5 | 4.0 | 2.6 |
| 9 | " | 0.020 | 0.011 | " | 0.16 | 0.56 | 0.19 | 0.021 | 0.012 | 0.031 | 92.7 | 3.7 | 3.9 | 2.9 |
| 10 | " | 0.021 | 0.011 | " | 0.17 | 0.32 | 0.19 | 0.022 | 0.011 | 0.022 | 49.1 | 3.0 | 4.1 | 2.4 |
| 11 | " | 0.019 | 0.010 | " | 0.17 | 0.36 | 0.21 | 0.020 | 0.011 | 0.028 | 56.4 | 3.4 | 4.0 | 2.8 |
| 12 | " | 0.019 | 0.009 | " | 0.16 | 0.40 | 0.20 | 0.019 | 0.010 | 0.023 | 63.6 | 3.3 | 4.0 | 2.9 |
| 13 | " | 0.020 | 0.011 | " | 0.19 | 0.45 | 0.21 | 0.021 | 0.011 | 0.032 | 70.9 | 3.2 | 3.9 | 2.7 |

Iron is the balance in the chemical composition of carbonaceous semiproduct and final steel for all examples.

As an oxide material containing the alloying element (manganese) use was made of a manganese-containing oxide material of the following chemical composition, %: MnO 54.8; $SiO_2$ 18.0; $Fe_2O_3$ 2.3; $Al_2O_3$ 3.0; CaO 5.0; MgO 2.1; C 2.2; P 0.15; S 0.015; losses on ignition 12.435.

ing the temperature equal to 1645° C., the carbon semiproduct was tapped into a steel-pouring ladle lined with fire-clay.

As the ladle became filled with the carbon semiproduct in amount from 0.2 to 0.6 of the total mass thereof, manganese-containing oxide material (4.0 t), lime (1.1 t), fluorite (0.15 t), aluminium alloy (0.82 t), and ferrosilicium with 65% Si (1.0 t) were supplied into the ladle.

The process of steel alloying with manganese was ended with the completion of tapping the carbon semiproduct into the ladle and continued for no more than 4 min.

The final steel was poured on the machine for continuous casting (MCC) to slabs rolled to plates 20 mm thick.

The extraction of manganese from the oxide material to the final steel was 94.5%.

Contamination of the final metal with nonmetallic inclusions was determined by an average value for six specimens for each type of the inclusions.

It was found that the average value for oxides was 1.4, sulphides 1.8, and silicates 1.9 against 3.4, 4.4, and 2.8, respectively, for the steel alloyed with manganese ferroalloys.

Thus, as is seen from Table 2, the use of the proposed method ensures the production of steel of a high quality. The cost of the steel was decreased due to an efficient use of manganese entering into the composition of the oxide material and the reducer whose losses caused by the interaction with atmospheric oxygen were almost completely ruled out.

Besides, from Table 2 it is also seen that the infringement of the claimed technology results in deterioration of the process characteristics of the final steel.

Examples No. 2,3,4,12, and 13 correspond to the process parameters of the claimed method. In those examples, the most optimum characteristics of the final steel were obtained, namely, the least contamination of the final steel with nonmetallic inclusions and a high degree of manganese extraction from the oxide material.

Example 3

Production of Killed Titanium-Containing Steel

Titanium-containing killed steel was produced in 350 t oxygen converter. The metal was adjusted to a preset chemical composition in the ladle.

Table 3 illustrates twelve examples of producing titanium-containing killed steel and process parameters corresponding to the claimed process and those that depart from the scope of the claimed process.

TABLE 3

| No. 1 | Time of introduction of oxide material; the fraction of carbon semiproduct (c.s.) being tapped | | Time of introducing the reducer | | Temperature of thermal treatment, °C. | Chemical composition of carbon semiproduct, mass % | |
|---|---|---|---|---|---|---|---|
| | beginning 2 | end 3 | beginning 4 | end 5 | 6 | C 7 | Si 8 |
| 1 | 0.2 of the total mass of c.s. | prior to the completion of tapping c.s. | after oxide material | prior to the completion of tapping c.s. | 800 | 0.07 | traces |
| 2 | 0.25 | prior to the completion of tapping c.s. | after oxide material | prior to the completion of tapping c.s. | 900 | 0.08 | " |
| 3 | 0.35 | prior to the completion of tapping c.s. | after oxide material | prior to the completion of tapping c.s. | 1100 | 0.07 | " |
| 4 | 0.50 | prior to the completion of tapping c.s. | after oxide material | prior to the completion of tapping c.s. | 1250 | 0.06 | " |
| 5 | 0.60 | prior to the completion of tapping c.s. | after oxide material | prior to the completion of tapping c.s. | 1350 | 0.06 | " |
| 6 | 0.20 | prior to the completion of tapping c.s. | after oxide material | prior to the completion of tapping c.s. | 1100 | 0.08 | " |
| 7 | 0.60 | prior to the completion of tapping c.s. | after oxide material | prior to the completion of tapping c.s. | 1100 | 0.08 | " |
| 8 | 0.35 | after the completion of tapping c.s. | after oxide material | prior to the completion of tapping c.s. | 1100 | 0.07 | " |
| 9 | 0.35 | prior to the completion of tapping c.s. | prior to oxide material | prior to the completion of tapping c.s. | 1100 | 0.06 | " |
| 10 | 0.35 | prior to the completion of tapping c.s. | after oxide material | after the completion of tapping c.s. | 1100 | 0.06 | " |
| 11 | 0.35 | prior to the completion of tapping c.s. | after oxide material | prior to the completion of tapping c.s. | 800 | 0.07 | " |
| 12 | 0.35 | prior to the completion of tapping c.s. | after oxide material | prior to the completion of tapping c.s. | 1350 | 0.07 | " |

| No. 1 | Chemical composition of carbon semiproduct, mass % | | | | | Chemical composition of the final steel, mass % | | | |
|---|---|---|---|---|---|---|---|---|---|
| | Mn 9 | S 10 | P 11 | Al 12 | Ti 13 | C 14 | Si 15 | Mn 16 | S 17 |
| 1 | 0.06 | 0.021 | 0.015 | traces | traces | 0.07 | 0.21 | 0.88 | 0.021 |
| 2 | 0.06 | 0.021 | 0.016 | " | " | 0.08 | 0.22 | 1.43 | 0.021 |
| 3 | 0.07 | 0.022 | 0.014 | " | " | 0.07 | 0.20 | 1.44 | 0.022 |
| 4 | 0.06 | 0.020 | 0.014 | " | " | 0.06 | 0.21 | 1.42 | 0.020 |
| 5 | 0.06 | 0.021 | 0.015 | " | " | 0.06 | 0.20 | 0.90 | 0.021 |
| 6 | 0.07 | 0.019 | 0.013 | " | " | 0.08 | 0.20 | 0.87 | 0.020 |
| 7 | 0.07 | 0.019 | 0.013 | " | " | 0.08 | 0.21 | 0.90 | 0.019 |

TABLE 3-continued

| 8  | 0.07 | 0.022 | 0.014 | "  | "  | 0.07 | 0.22 | 1.09 | 0.022 |
| 9  | 0.06 | 0.023 | 0.015 | "  | "  | 0.06 | 0.22 | 0.48 | 0.023 |
| 10 | 0.06 | 0.021 | 0.013 | "  | "  | 0.06 | 0.21 | 0.68 | 0.021 |
| 11 | 0.07 | 0.021 | 0.013 | "  | "  | 0.07 | 0.20 | 0.75 | 0.021 |
| 12 | 0.06 | 0.022 | 0.012 | "  | "  | 0.07 | 0.19 | 1.15 | 0.022 |

| | Chemical composition of the final steel, mass % | | | Degree of manganese extraction, % | Degree of titanium extraction, % | Value of nonmetallic inclusions | | |
|---|---|---|---|---|---|---|---|---|
| No. | P | Al | Ti | | | oxides | sulphides | silicates |
| 1 | 18 | 19 | 20 | 21 | 22 | 23 | 24 | 25 |
| 1  | 0.015 | 0.031 | 0.048 | 58.6 | 53.3 | 3.2 | 4.3 | 2.7 |
| 2  | 0.016 | 0.033 | 0.084 | 97.8 | 93.3 | 1.3 | 1.8 | 1.7 |
| 3  | 0.014 | 0.034 | 0.085 | 97.8 | 94.4 | 1.4 | 1.9 | 1.9 |
| 4  | 0.014 | 0.033 | 0.085 | 97.1 | 94.4 | 1.3 | 2.0 | 1.8 |
| 5  | 0.015 | 0.03  | 0.047 | 60   | 52.2 | 3.1 | 4.0 | 2.3 |
| 6  | 0.013 | 0.028 | 0.045 | 58.1 | 50.0 | 2.8 | 4.1 | 2.6 |
| 7  | 0.013 | 0.03  | 0.050 | 59.3 | 55.5 | 3.3 | 4.4 | 2.8 |
| 8  | 0.014 | 0.031 | 0.062 | 72.9 | 68.9 | 3.5 | 4.3 | 2.7 |
| 9  | 0.015 | 0.030 | 0.022 | 30.0 | 24.4 | 3.0 | 4.3 | 2.8 |
| 10 | 0.013 | 0.030 | 0.036 | 44.3 | 40.0 | 2.9 | 4.2 | 2.8 |
| 11 | 0.014 | 0.028 | 0.03  | 48.6 | 33.3 | 3.0 | 4.1 | 2.7 |
| 12 | 0.013 | 0.029 | 0.06  | 77.9 | 66.7 | 2.7 | 4.4 | 2.6 |

Iron is the balance in the chemical composition of carbonaceous semiproduct and final steel for all examples.

Alloying with manganese and titanium was performed simultaneously. As alloying materials use was made of the following oxide materials:

1. Thermally pretreated manganese-containing oxide material identical to that described in Example 2;
2. Titanium oxide material of the following chemical composition (mass, %): $TiO_2$ 48.55; $SiO_2$ 0.6; MnO 2.65; FeO 20.0; $Fe_2O_3$ 28.2. The oxide material was thermally pretreated at a temperature of 800° C.

The slag-forming materials and metallic reducer were similar to those used in the above examples.

After preparation in the converter of the carbon semiproduct it was tapped into the ladle with a fire-clay lining.

After tapping the carbon semiproduct in amount from 0.2 to 0.6 of the total mass thereof, the oxide materials were supplied; manganese oxide material in amount 12 t, titanium-containing oxide material 1.15 t, lime 1.5 t, fluorite 0.2 t, and reducer 3.5 t.

The produced steel was poured on MCC and rolled to a plate 10 mm thick.

The tests of the plates have shown that the infrigement of the claimed technology and claimed parameters of the method results in that contamination of the final steel with nonmetallic inclusions increases almost twice and becomes close to that of steel alloyed with ferroalloys. A lowered content of the nonmetallic phase determines a high quality of the metal produced. A high degree of extraction of alloying elements determines a lower cost of the final steel.

From Table 3 it is seen that in Examples 2,3,4,11, and 12 the most optimum characteristics of the final metal are attained, namely, the least contamination of the steel with nonmetallic inclusions and a high degree of manganese and titanium extraction from the oxide materials. These examples correspond to the claimed method.

EXAMPLE 4

Production of Rimming Steel

Rimming steel was produced in a 150 t oxygen converter and adjusted to a preset chemical composition in the ladle. Use was made of a manganese-containing material similar to that described in Example 2.

Table 4 illustrates 18 examples of producing rimming steel and process parameters corresponding to the claimed process and those depart from the scope of the claimed process.

TABLE 4

| | Time of introduction of oxide material; the fraction of carbon semiproduct (c.s.) being tapped | | Time of introducing the reducer | | Temperature of thermal treatment of oxide material, | Amount of manganese introduced, |
|---|---|---|---|---|---|---|
| No. | beginning | end | beginning | end | °C. | kg/t |
| 1 | 2 | 3 | 4 | 5 | 6 | 7 |
| 1 | 0.2 of the total mass of c.s. | prior to the completion of tapping c.s. | after oxide material | prior to the completion of tapping c.s. | 800 | 2.0 |
| 2 | 0.25 | prior to the completion of tapping c.s. | after oxide material | prior to the completion of tapping c.s. | 900 | 2.3 |
| 3 | 0.35 | prior to the completion of tapping c.s. | after oxide material | prior to the completion of tapping c.s. | 1100 | 3.1 |
| 4 | 0.5 | prior to the completion of tapping c.s. | after oxide material | prior to the completion of tapping c.s. | 1250 | 3.9 |
| 5 | 0.6 | prior to the completion of tapping c.s. | after oxide material | prior to the completion of tapping c.s. | 1350 | 4.3 |
| 6 | 0.2 | prior to the completion of tapping c.s. | after oxide material | prior to the completion of tapping c.s. | 1100 | 3.1 |
| 7 | 0.6 | prior to the completion of tapping c.s. | after oxide material | prior to the completion of tapping c.s. | 1100 | 3.1 |
| 8 | 0.35 | after tapping c.s. | after oxide material | prior to the completion of tapping c.s. | 1100 | 3.1 |
| 9 | 0.35 | prior to the completion of tapping c.s. | prior to oxide material | prior to the completion of tapping c.s. | 1100 | 3.1 |
| 10 | 0.35 | prior to the completion | after | after tapping c.s. | 1100 | 3.1 |

TABLE 4-continued

| No. | | Time of introduction of oxide material; the fraction of carbon semiproduct (c.s.) being tapped | | Time of introducing the reducer | | Temperature of thermal treatment of oxide material, °C | Amount of manganese introduced, kg/t |
|---|---|---|---|---|---|---|---|
| 11 | 0.35 | prior to the completion of tapping c.s. | oxide material after oxide material | prior to the completion of tapping c.s. | | 800 | 3.1 |
| 12 | 0.35 | prior to the completion of tapping c.s. | oxide material after oxide material | prior to the completion of tapping c.s. | | 1350 | 3.1 |
| 13 | 0.35 | prior to the completion of tapping c.s. | oxide material after oxide material | prior to the completion of tapping c.s. | | 1100 | 2.0 |
| 14 | 0.35 | prior to the completion of tapping c.s. | oxide material after oxide material | prior to the completion of tapping c.s. | | 1100 | 4.3 |
| 15 | 0.35 | prior to the completion of tapping c.s. | oxide material after oxide material | prior to the completion of tapping c.s. | | 1100 | 3.1 |
| 16 | 0.35 | prior to the completion of tapping c.s. | oxide material after oxide material | prior to the completion of tapping c.s. | | 1100 | 3.1 |
| 17 | 0.35 | prior to the completion of tapping c.s. | oxide material after oxide material | prior to the completion of tapping c.s. | | 1100 | 3.1 |
| 18 | 0.35 | prior to the completion of tapping c.s. | oxide material after oxide material | prior to the completion of tapping c.s. | | 1100 | 3.1 |

| No. 1 | Al/Mn ratio 8 | Chemical composition of carbon semiproduct, mass % | | | | | Chemical composition of the final steel, mass % | | | | | Degree of manganese extraction, % |
|---|---|---|---|---|---|---|---|---|---|---|---|---|
| | | C 9 | Si 10 | Mn 11 | S 12 | P 13 | Al 14 | C 15 | Si 16 | Mn 17 | S 18 | P 19 | Al 20 | 21 |
| 1 | 0.25:0.9 | 0.05 | traces | 0.05 | 0.018 | 0.013 | traces | 0.05 | traces | 0.17 | 0.018 | 0.013 | traces | 60.0 |
| 2 | 0.3:0.95 | 0.05 | " | 0.05 | 0.016 | 0.014 | " | 0.05 | " | 0.24 | 0.016 | 0.014 | " | 82.6 |
| 3 | 0.31:1.0 | 0.06 | " | 0.06 | 0.017 | 0.013 | " | 0.06 | " | 0.32 | 0.017 | 0.013 | " | 83.9 |
| 4 | 0.32:1.05 | 0.05 | " | 0.05 | 0.017 | 0.014 | " | 0.05 | " | 0.37 | 0.017 | 0.014 | " | 82.1 |
| 5 | 0.35:1.1 | 0.06 | " | 0.06 | 0.016 | 0.014 | " | 0.06 | " | 0.3 | 0.016 | 0.014 | " | 35.8 |
| 6 | 0.31:1.0 | 0.06 | " | 0.05 | 0.018 | 0.012 | " | 0.06 | " | 0.2 | 0.018 | 0.012 | " | 48.4 |
| 7 | 0.31:1.0 | 0.05 | " | 0.05 | 0.016 | 0.012 | " | 0.05 | " | 0.22 | 0.016 | 0.012 | " | 54.8 |
| 8 | 0.31:1.0 | 0.05 | " | 0.06 | 0.015 | 0.012 | " | 0.05 | " | 0.21 | 0.015 | 0.012 | " | 48.4 |
| 9 | 0.31:1.0 | 0.06 | " | 0.06 | 0.017 | 0.014 | " | 0.06 | " | 0.16 | 0.017 | 0.014 | " | 32.2 |
| 10 | 0.31:1.0 | 0.06 | " | 0.06 | 0.017 | 0.013 | " | 0.06 | " | 0.18 | 0.017 | 0.013 | " | 41.9 |
| 11 | 0.31:1.0 | 0.06 | " | 0.06 | 0.018 | 0.013 | " | 0.06 | " | 0.21 | 0.018 | 0.013 | " | 48.4 |
| 12 | 0.31:1.0 | 0.05 | " | 0.05 | 0.016 | 0.012 | " | 0.05 | " | 0.25 | 0.016 | 0.012 | " | 64.5 |
| 13 | 0.31:1.0 | 0.05 | " | 0.05 | 0.018 | 0.014 | " | 0.05 | " | 0.19 | 0.018 | 0.014 | " | 70.0 |
| 14 | 0.31:1.0 | 0.05 | " | 0.06 | 0.019 | 0.015 | " | 0.05 | " | 0.36 | 0.019 | 0.015 | " | 69.8 |
| 15 | 0.25:1.0 | 0.06 | " | 0.06 | 0.019 | 0.015 | " | 0.06 | " | 0.22 | 0.019 | 0.015 | " | 51.6 |
| 16 | 0.35:1.0 | 0.06 | " | 0.05 | 0.018 | 0.014 | " | 0.06 | " | 0.29 | 0.018 | 0.014 | " | 77.4 |
| 17 | 0.31:0.9 | 0.05 | " | 0.05 | 0.016 | 0.012 | " | 0.05 | " | 0.29 | 0.016 | 0.012 | " | 77.4 |
| 18 | 0.31:1.1 | 0.06 | " | 0.06 | 0.016 | 0.015 | " | 0.06 | " | 0.23 | 0.016 | 0.015 | " | 54.8 |

Iron is the balance in the chemical composition of carbonaceous semiproduct and final steel for all examples.

Prior to introduction into the ladle, the manganese-containing oxide material was thermally pretreated at a temperature of from 800° to 1350° C.

After the preparation of the carbon semiproduct in the converter and attaining 1600° C., the carbon semiproduct was tapped for 6 min into a steel-pouring ladle lined with fire-clay.

At the beginning of the tapping process when the ladle became filled with the carbon semiproduct in amount from 0.2 to 0.6 of the total mass thereof, the manganese-containing material in an amount from 0.71 to 1.52 t, ensuring an introduction of manganese from 2.0 to 4.3 kg/t metal, lime (0.5 t), fluorite (0.025t), and an aluminium alloy in amount required for retaining the Al/Mn ratio within the limits shown in Table 4 were supplied into the ladle.

After the completion of tapping into the ladle, the metal was prepared having a chemical composition given in Table 4.

From Table 4 it is seen that the use of the proposed method within the scope of the claimed parameters and process provides the preparation of steel of a higher grade.

The degree of manganese extraction from the manganese oxide material to the final steel was about 80%. No manganese ferroalloys were used.

Thus, the elimination of the use of manganese ferroalloys in the production of rimming steel decreased manganese losses by 12-15% including the losses which arise in production of ferroalloys and in the course of alloying steel in the ladle which ferroalloys.

The prepared steel was cast into 16.7 t ingots. The evaluation of surface and mechanical characteristics of the rolled stock (a plate 2 mm thick) has shown that the amount of defects in rolled products was decreased by 21%.

From Table 4 it is seen that in Examples 2,3,4, 11-18 the process parameters corresponds to the claimed method. In these examples the degree of manganese extraction was the highest.

EXAMPLE 5

Production f Vanadium-Containing Rimming Steel

Vanadium-containing rimming steel was produced in a 250 t oxygen converter and adjusted to a preset chemical composition oin a steel-pouring ladle.

Table 5 illustrates 18 examples of producing vanadium-containing rimming steel and process parameters corresponding to the claimed process and those depart from the scope of the claimed process.

TABLE 5

| | Time of introduction of oxide material; the fraction of carbon semiproduct (c.s.) being tapped | | Time of introducing the reducer | | Temperature of thermal treatment of | Amount of |
|---|---|---|---|---|---|---|
| No. | beginning | end | beginning | end | oxide material, °C. | manganese introduced, kg/t |

TABLE 5-continued

| 1 | 2 | 3 | 4 | 5 | 6 | 7 |
|---|---|---|---|---|---|---|
| 1 | 0.2 of the total mass of c.s. | prior to the completion of tapping c.s. | after oxide material | prior to the completion of tapping c.s. | 800 | 2.0 |
| 2 | 0.25 | prior to the completion of tapping c.s. | after oxide material | prior to the completion of tapping c.s. | 900 | 2.3 |
| 3 | 0.35 | prior to the completion of tapping c.s. | after oxide material | prior to the completion of tapping c.s. | 1100 | 3.1 |
| 4 | 0.5 | prior to the completion of tapping c.s. | after oxide material | prior to the completion of tapping c.s. | 1250 | 3.9 |
| 5 | 0.6 | prior to the completion of tapping c.s. | after oxide material | prior to the completion of tapping c.s. | 1350 | 4.3 |
| 6 | 0.2 | prior to the completion of tapping c.s. | after oxide material | prior to the completion of tapping c.s. | 1100 | 3.1 |
| 7 | 0.6 | prior to the completion of tapping c.s. | after oxide material | prior to the completion of tapping c.s. | 1100 | 3.1 |
| 8 | 0.35 | after tapping c.s. | after oxide material | prior to the completion of tapping c.s. | 1100 | 3.1 |
| 9 | 0.35 | prior to the completion of tapping c.s. | prior to oxide material | prior to the completion of tapping c.s. | 1100 | 3.1 |
| 10 | 0.35 | prior to the completion of tapping c.s. | after the delivery of oxide material | after tapping c.s. | 1100 | 3.1 |
| 11 | 0.35 | prior to the completion of tapping c.s. | after the delivery of oxide material | prior to the completion of tapping c.s. | 800 | 3.1 |
| 12 | 0.35 | prior to the completion of tapping c.s. | after the delivery of oxide material | prior to the completion of tapping c.s. | 1350 | 3.1 |
| 13 | 0.35 | prior to the completion of tapping c.s. | after the delivery of oxide material | prior to the completion of tapping c.s. | 1100 | 2.0 |
| 14 | 0.35 | prior to the completion of tapping c.s. | after the delivery of oxide material | prior to the completion of tapping c.s. | 1100 | 4.3 |
| 15 | 0.35 | prior to the completion of tapping c.s. | after the delivery of oxide material | prior to the completion of tapping c.s. | 1100 | 3.1 |
| 16 | 0.35 | prior to the completion of tapping c.s. | after the delivery of oxide material | prior to the completion of tapping c.s. | 1100 | 3.1 |
| 17 | 0.35 | prior to the completion of tapping c.s. | after the delivery of oxide material | prior to the completion of tapping c.s. | 1100 | 3.1 |
| 18 | 0.35 | prior to the completion of tapping c.s. | after the delivery of oxide material | prior to the completion of tapping c.s. | 1100 | 3.1 |

| No. 1 | Al/Mn ratio 8 | Chemical composition of the carbon semiproduct, mass % | | | | | | Chemical composition of the final steel, mass % | | | | | | | Degree of manganese extraction, % 23 | Degree of vanadium extraction, % 24 |
|---|---|---|---|---|---|---|---|---|---|---|---|---|---|---|---|---|
| | | C 9 | Si 10 | Mn 11 | S 12 | P 13 | Al 14 | V 15 | C 16 | Si 17 | Mn 18 | S 19 | P 20 | Al 21 | V 22 | | |
| 1 | 0.25:0.9 | 0.06 | traces | 0.06 | 0.017 | 0.015 | traces | traces | 0.06 | traces | 0.18 | 0.017 | 0.015 | traces | 0.007 | 60.0 | 43.7 |
| 2 | 0.3:0.95 | 0.05 | " | 0.06 | 0.018 | 0.013 | " | " | 0.05 | " | 0.24 | 0.018 | 0.013 | " | 0.014 | 78.3 | 87.5 |
| 3 | 0.31:1.0 | 0.06 | " | 0.07 | 0.017 | 0.014 | " | " | 0.06 | " | 0.32 | 0.017 | 0.014 | " | 0.015 | 80.6 | 93.7 |
| 4 | 0.32:1.05 | 0.06 | " | 0.05 | 0.017 | 0.013 | " | " | 0.06 | " | 0.35 | 0.017 | 0.013 | " | 0.014 | 76.9 | 87.5 |
| 5 | 0.35:1.1 | 0.05 | " | 0.05 | 0.016 | 0.012 | " | " | 0.05 | " | 0.32 | 0.017 | 0.012 | " | 0.066 | 62.8 | 37.5 |
| 6 | 0.31:1.0 | 0.05 | " | 0.05 | 0.018 | 0.015 | " | " | 0.05 | " | 0.16 | 0.018 | 0.015 | " | 0.005 | 55.0 | 31.3 |
| 7 | 0.31:1.0 | 0.06 | " | 0.05 | 0.018 | 0.014 | " | " | 0.06 | " | 0.28 | 0.019 | 0.014 | " | 0.006 | 53.5 | 37.5 |
| 8 | 0.31:1.0 | 0.05 | " | 0.07 | 0.017 | 0.013 | " | " | 0.05 | " | 0.22 | 0.018 | 0.013 | " | 0.004 | 48.4 | 25.0 |
| 9 | 0.31:1.0 | 0.06 | " | 0.07 | 0.016 | 0.012 | " | " | 0.06 | " | 0.27 | 0.016 | 0.013 | " | 0.003 | 64.5 | 18.7 |
| 10 | 0.31:1.0 | 0.06 | " | 0.05 | 0.017 | 0.014 | " | " | 0.06 | " | 0.20 | 0.017 | 0.014 | " | 0.003 | 48.4 | 18.7 |
| 11 | 0.31:1.0 | 0.05 | " | 0.05 | 0.018 | 0.013 | " | " | 0.05 | " | 0.24 | 0.018 | 0.013 | " | 0.004 | 61.3 | 25.0 |
| 12 | 0.31:1.0 | 0.05 | " | 0.06 | 0.017 | 0.015 | " | " | 0.05 | " | 0.24 | 0.018 | 0.015 | " | 0.006 | 58.1 | 37.5 |
| 13 | 0.31:1.0 | 0.06 | " | 0.07 | 0.018 | 0.015 | " | " | 0.06 | " | 0.22 | 0.019 | 0.015 | " | 0.013 | 48.4 | 81.3 |
| 14 | 0.31:1.0 | 0.06 | " | 0.06 | 0.016 | 0.012 | " | " | 0.06 | " | 0.23 | 0.016 | 0.012 | " | 0.014 | 54.8 | 87.5 |
| 15 | 0.25:1.0 | 0.06 | " | 0.06 | 0.017 | 0.012 | " | " | 0.06 | " | 0.19 | 0.017 | 0.012 | " | 0.013 | 41.9 | 81.3 |
| 16 | 0.35:1.0 | 0.05 | " | 0.05 | 0.019 | 0.013 | " | " | 0.05 | " | 0.17 | 0.019 | 0.013 | " | 0.012 | 38.7 | 75.0 |
| 17 | 0.31:0.9 | 0.06 | " | 0.05 | 0.019 | 0.012 | " | " | 0.06 | " | 0.13 | 0.019 | 0.012 | " | 0.013 | 25.8 | 81.3 |
| 18 | 0.31:1.1 | 0.05 | " | 0.06 | 0.018 | 0.014 | " | " | 0.05 | " | 0.13 | 0.018 | 0.014 | " | 0.014 | 22.6 | 87.5 |

Iron is the balance in the chemical composition of carbonaceous semiproduct and final steel for all examples.

Alloying with manganese and vanadium was accomplished by the reduction thereof from the oxide materials.

For this purpose use was made of thermally pre-treated (from 800° to 1100° C.) manganese- and vanadium-containing oxide materials containing, mass %: $V_2O_5$ 85.23; $SiO_2$ 2.5; $Fe_2O_3$ 7.0 $Al_2O_3$ 0.4; CaO 2.1; MgO 0.6; $TiO_2$ 1.8; P 0.07; S 0.3. The oxide material was treated at a temperature of 1600° C.

As the slag-forming materials and as a reducer use was made of the materials identicla to those described in Example 2.

After preparation of the carbon semiproduct in the converter and attaining a temperature of 1635° C., said product was tapped in to the ladle with a basic lining.

After tapping the carbon semiproduct in amount from 0.2 to 0.6 of the total mass thereof, vanadium-containing oxide material (1.0 t), manganese-containing oxide material (from 1.2 to 2.5 t which ensures the introduction of manganese from 2.0 to 4.3 kg per ton of the carbon semiproduct), lime (0.8 t), fluorite (0.06 t), and aluminium alloy in amount corresponding to the Al/Mn ratios shown in Table 5 were supplied to the ladle.

After the completion of tapping, the steel was prepared in the ladle whose chemical composition is given in Table 5.

the degree of vanadium extraction was 89% and that of manganese 90.6%. No manganese and vanadium ferroalloys were used in producing the steel.

The final steel was poured into 8.17 t molds which then were rolled into billets. The evaluation of the surface quality has shown that the amount of defects was cut down by 25%.

A high degree of extraction of alloying elements from the oxide material makes it possible to cut down the cost of the final steel.

Examples 2,3,4, 11–18 correspond to the process parameters of the claimed method.

In these examples the final metal has the most optimum characteristics, namely the highest degrees of extraction manganese and vanadium from the oxide materials.

EXAMPLE 6

Production of Aluminium-Alloyed Steel

Aluminium-alloyed steel was produced in a 350 t oxygen converter and adjusted to a preset chemical composition in the steel-pouring ladle.

Table 6 illustrates 14 examples of producing aluminium-alloyed steel and process parameters corresponding to the claimed process and those depart from the scope of the claimed process.

TABLE 6

| No. 1 | Time of introduction of oxide material; the fraction of carbon semiproduct (c.s.) being tapped | | Time of introducing the reducer | | Temperature of thermal treatment of manganese-containing oxide material, °C. 6 | Amount of manganese introduced after tapping c.s. kg/t 7 |
|---|---|---|---|---|---|---|
| | beginning 2 | end 3 | beginning 4 | end 5 | | |
| 1 | 0.2 of the total mass of c.s. | prior to the completion of tapping c.s. | after oxide material | prior to the completion of tapping c.s. | 800 | 0.4 |
| 2 | 0.25 | prior to the completion of tapping c.s. | after oxide material | prior to the completion of tapping c.s. | 900 | 0.45 |
| 3 | 0.35 | prior to the completion of tapping c.s. | after oxide material | prior to the completion of tapping c.s. | 1100 | 0.65 |
| 4 | 0.5 | prior to the completion of tapping c.s. | after oxide material | prior to the completion of tapping c.s. | 1250 | 0.85 |
| 5 | 0.6 | prior to the completion of tapping c.s. | after oxide material | prior to the completion of tapping c.s. | 1350 | 0.90 |
| 6 | 0.2 | prior to the completion of tapping c.s. | after oxide material | prior to the completion of tapping c.s. | 1100 | 0.65 |
| 7 | 0.6 | prior to the completion of tapping c.s. | after oxide material | prior to the completion of tapping c.s. | 1100 | 0.65 |
| 8 | 0.35 | after tapping c.s. | after oxide material | prior to the completion of tapping c.s. | 1100 | 0.65 |
| 9 | 0.35 | prior to the completion of tapping c.s. | prior to oxide material | prior to the completion of tapping c.s. | 1100 | 0.65 |
| 10 | 0.35 | prior to the completion of tapping c.s. | after oxide material | after tapping c.s. | 1100 | 0.65 |
| 11 | 0.35 | prior to the completion of tapping c.s. | after oxide material | prior to the completion of tapping c.s. | 800 | 0.65 |
| 12 | 0.35 | prior to the completion of tapping c.s. | after oxide material | prior to the completion of tapping c.s. | 1350 | 0.65 |
| 13 | 0.35 | prior to the completion of tapping c.s. | after oxide material | prior to the completion of tapping c.s. | 1100 | 0.4 |
| 14 | 0.35 | prior to the completion of tapping c.s. | after oxide material | prior to the completion of tapping c.s. | 1100 | 0.9 |

| No. 1 | Chemical composition of carbon semiproduct, mass % | | | | | | Chemical composition of the final steel, mass % | | | | | | Mechanical characteristics, kgs/mm$^2$ | | Degree of manganese extraction, % 22 |
|---|---|---|---|---|---|---|---|---|---|---|---|---|---|---|---|
| | C 8 | Si 9 | Mn 10 | S 11 | P 12 | Al 13 | C 14 | Si 15 | Mn 16 | S 17 | P 18 | Al 19 | $\delta_1$ 20 | $\delta_2$ 21 | |
| 1 | 0.06 | traces | 0.07 | 0.018 | 0.01 | traces | 0.06 | traces | 0.29 | 0.018 | 0.010 | 0.038 | 17 | 31 | 73.3 |
| 2 | 0.07 | " | 0.07 | 0.018 | 0.011 | " | 0.07 | " | 0.36 | 0.018 | 0.011 | 0.043 | 21 | 33 | 96.7 |
| 3 | 0.06 | " | 0.06 | 0.019 | 0.011 | " | 0.06 | " | 0.35 | 0.019 | 0.011 | 0.063 | 20 | 32 | 96.7 |
| 4 | 0.06 | " | 0.06 | 0.019 | 0.012 | " | 0.06 | " | 0.35 | 0.019 | 0.012 | 0.082 | 20 | 32 | 96.6 |
| 5 | 0.07 | " | 0.07 | 0.018 | 0.012 | " | 0.07 | " | 0.28 | 0.018 | 0.012 | 0.086 | 18 | 32 | 70.0 |
| 6 | 0.07 | " | 0.05 | 0.017 | 0.010 | " | 0.07 | " | 0.25 | 0.017 | 0.010 | 0.063 | 17 | 33 | 66.7 |
| 7 | 0.06 | " | 0.05 | 0.017 | 0.010 | " | 0.06 | " | 0.26 | 0.017 | 0.010 | 0.062 | 17 | 32 | 70.0 |
| 8 | 0.07 | " | 0.07 | 0.019 | 0.011 | " | 0.07 | " | 0.26 | 0.019 | 0.011 | 0.064 | 18 | 33 | 63.3 |
| 9 | 0.06 | " | 0.07 | 0.017 | 0.012 | " | 0.06 | " | 0.17 | 0.017 | 0.012 | 0.062 | 16 | 30 | 33.3 |
| 10 | 0.06 | " | 0.08 | 0.019 | 0.011 | " | 0.06 | " | 0.23 | 0.019 | 0.011 | 0.061 | 17 | 32 | 50.0 |
| 11 | 0.07 | " | 0.06 | 0.017 | 0.010 | " | 0.07 | " | 0.23 | 0.017 | 0.010 | 0.061 | 18 | 33 | 56.7 |
| 12 | 0.07 | " | 0.07 | 0.016 | 0.010 | " | 0.07 | " | 0.29 | 0.016 | 0.010 | 0.062 | 19 | 34 | 73.3 |

TABLE 6-continued

| 13 | 0.07 | " | 0.07 | 0.018 | 0.011 | " | 0.07 | " | 0.36 | 0.018 | 0.011 | 0.037 | 19 | 34 | 96.7 |
| 14 | 0.06 | " | 0.05 | 0.018 | 0.011 | " | 0.06 | " | 0.34 | 0.018 | 0.011 | 0.087 | 17 | 34 | 96.6 |

Chemical composition of the final steel is given in Table 6.

Iron is the balance in the composition of carbonaceous semiproduct and final steel for all examples.

Materials identical to those described in Example 4 were used.

Manganese-containing oxide material was thermally treated at a temperature of from 800° to 1100° C.

After preparation of the carbon semiproduct in the ladle and attaining the temperature 1650° C., said product was tapped into the ladle.

After tapping from 0.2 to 0.6 of the total mass of the carbon semiproduct, manganese-containing oxide material (2.3 t), lime (0.6 fluorite (0.08 t), and aluminium alloy (0.68 t) were supplied into the ladle.

After the completion of the tapping the carbon semiproduct, an additional amount of aluminium alloy was fed into the ladle at a specific consumption of aluminium 0.4–0.9 kg per ton of the carbon semiproduct.

Chemical composition of the final steel is given in Table 6.

The degree of manganese extraction from the manganese-containing oxide material into the final steel was 93% and that of aluminium 94%. The process of alloying steel with manganese was ended with the completion of tapping the carbon semiproduct into the ladle.

The final steel was of a high quality. This is illustrated by the mechanical characteristics: $\sigma_1 = 21.0$ kg/mm$^2$; $\sigma_2 = 33.0$ kg/mm$^2$, where $\sigma_1$ is the yield point and $\sigma_2$ ultimate strength.

High degrees of manganese and aluminium extraction favoured a decrease in the cost of the final steel due to the efficient use of the materials.

From Table 6 it is seen that the use of the proposed method within the scope of the claimed parameters and process ensures the preparation of the metal with the most optimum characteristics namely, the optimum mechanical characteristics of the final steel and a high degree of manganese extraction from the oxide material (Examples Nos. 2–4, 11–14).

INDUSTRIAL APPLICABILITY

Thus, as is seen from the Examples and the Tables attached, the use of the proposed method ensures the preparation of alloyed general-purpose steel without the application of ferroalloys.

The use of the proposed invention makes it possible to accelerate the process of reduction of alloying elements from oxide materials and to obtain the final steel at the moment of completion of tapping the carbon semiproduct into the ladle.

This allows one to enhance the output of a steel-making unit and rules out the necessity to use an additional processing of steel in order to improve quality.

Besides, due to elimination of slopping and splashing of molten metals and slag from the ladle and because of a sharp decrease of liberation of gaseous products of deoxidation and steel alloying into the environment, the labour conditions of personnel being greatly improved.

We claim:

1. A method of producing general-purpose steel comprising preparing a carbon-containing semiproduct, tapping the carbon-containing semi-product in the presence of a slag-forming material into a ladle, said carbon-containing semi-product being tapped into the ladle in a first portion in an amount of no less than 0.25 and no more than 0.5 of the total mass of the carbon-containing semi-product and a second portion amounting to the balance of the carbon-containing semi-product, continuously adding a thermally pre-treated oxide material during the addition of the second portion of the carbon-containing semi-product and terminating the addition of said thermally pre-treated oxide material before the addition of the second portion of the carbon-containing semi-product is concluded, and adding a reducer after the addition of the thermally pre-treated oxide material is terminated and prior to the completion of the addition of the second portion of the carbon-containing semi-product.

2. The method of claim 1 wherein the thermally pre-treated oxide material comprises a manganese-containing oxide thermally pretreated at a temperature of from about 900° C. to about 1250° C.

3. The method of claim 2 wherein the general purpose steel is rimming steel, said process comprising supplying said manganese-containing oxide in an amount sufficient to provide 2.30–3.90kg of manganese per ton of the carbon-containing semiproduct.

4. The method of claim 3 wherein the reducer comprises aluminum, the amount of aluminum being sufficient so that the mass ratio of the consumption of aluminum to the amount of manganese entering the steel product is in the range of from (0.30–0.32):(0.95–1.05).

5. The method of claim 2 further comprising:
adding aluminum as the reducer in an amount so that the mass ratio of the consumption of aluminum to the amount of manganese entering the steel product is from (0.30–0.32):(0.95–1.05);
adding the slag forming material to the ladle after the step of adding the aluminum as the reducer;
adding an additional amount of aluminum of 0.45–0.85kg per ton of the carbon-containing semi-product after the carbon containing semiproduct has been tapped into the ladle; and
blowing an inert gas through the resulting product.

* * * * *